United States Patent
Hamasaki, Jr. et al.

(10) Patent No.: US 7,921,182 B2
(45) Date of Patent: Apr. 5, 2011

(54) MANAGEMENT OF SERVICE COMPONENTS INSTALLED IN AN ELECTRONIC DEVICE IN A MOBILE SERVICES NETWORK

(75) Inventors: Glenn Hamasaki, Jr., Aliso Viejo, CA (US); Harri Okkonen, Dana Point, CA (US); James P. Gustafson, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1341 days.

(21) Appl. No.: 10/748,053

(22) Filed: Dec. 30, 2003

(65) Prior Publication Data

US 2004/0215702 A1    Oct. 28, 2004

Related U.S. Application Data

(60) Provisional application No. 60/437,588, filed on Dec. 31, 2002.

(51) Int. Cl.
*G06F 15/16* (2006.01)
(52) U.S. Cl. ........ 709/217; 709/201; 709/203; 709/216; 709/218; 709/219
(58) Field of Classification Search .................. 709/201, 709/203, 216, 217, 218, 219; 455/414, 411
See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |

(Continued)

FOREIGN PATENT DOCUMENTS

CA    2339923    3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner* — Djenane M Bayard

(57) ABSTRACT

Disclosed herein is an electronic device having a non-volatile memory including a plurality of memory sections. Each of the plurality of memory sections may be managed by a remote management server and an associated service and may participate in a mobile services network. The non-volatile memory may include manufacturer related content and data, such as firmware and an operating system. The non-volatile memory may also include operator related data and content, such as communication stacks for bearer communications. The non-volatile memory may also include corporation related data and content, such as confidential corporate information and software. The non-volatile memory may also include end user related data and content, such as gaming software and address book information. Each of the memory sections in the non-volatile memory may be managed by a different remote management server.

31 Claims, 8 Drawing Sheets

U.S. PATENT DOCUMENTS

| | | | | |
|---|---|---|---|---|
| 5,878,256 | A | 3/1999 | Bealkowski et al. | 395/652 |
| 5,960,445 | A | 9/1999 | Tamori et al. | 707/203 |
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,272,545 | B1 | 8/2001 | Flanagin et al. | |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0124007 | A1* | 9/2002 | Zhao | 707/102 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0022657 | A1* | 1/2003 | Herschberg et al. | 455/414 |
| 2003/0033358 | A1* | 2/2003 | Tran et al. | 709/203 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2004/0002943 | A1* | 1/2004 | Merrill et al. | 707/1 |
| 2004/0068363 | A1 | 4/2004 | Goto | |
| 2004/0203593 | A1* | 10/2004 | Whelan et al. | 455/411 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |
| WO | WO 02/23925 * | 3/2002 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

MANAGEMENT OF SERVICE COMPONENTS INSTALLED IN AN ELECTRONIC DEVICE IN A MOBILE SERVICES NETWORK

CROSS-REFERENCE TO OTHER APPLICATIONS

The present application claims the benefit of priority of U.S. Provisional Patent Application having Ser. No. 60/437,588, filed on Dec. 31, 2002, and hereby incorporates herein by reference the complete subject matter thereof in its entirety.

The present application also hereby incorporates herein by reference the complete subject matter of PCT Application having publication number WO 02/41147 A1, and having application number PCT/US01/44034, filed on Nov. 19, 2001, in its entirety.

The present application also hereby incorporates herein by reference the complete subject matter of U.S. Provisional Patent Application having Ser. No. 60/249,606, filed Nov. 17, 2000, and U.S. Provisional Patent Application, having Ser. No. 60/410,071, filed Sep. 12, 2002, in their respective entireties.

FEDERALLY SPONSORED RESEARCH OR DEVELOPMENT

Not Applicable

MICROFICHE/COPYRIGHT REFERENCE

Not Applicable

BACKGROUND OF THE INVENTION

Electronic devices (i.e., mobile electronic devices having software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. These firmware and application software often contain bugs. New versions of the firmware and software are periodically released to fix the bugs, introduce new features, or both.

Different components in the electronic devices may belong to different vendors and may be associated with different services. These components may be added, removed, enabled, disabled, deleted, updated, as necessary, in a dynamic mode. However, maintaining an association of components to services in electronic devices may be difficult and managing individual components is not a trivial task. Additionally, enabling/disabling services subscribed to by an end-user may require additional logic that expands the software in the electronic device beyond desirable limits.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a mobile services network for management of service components in an electronic device. The mobile services network may comprise a plurality of regions of data and content in the electronic device. The mobile services network may also comprise a plurality of server-side components. Each of the server-side components may manage at least one particular region of the plurality of regions of data and content in the electronic device.

In an embodiment of the present invention, the plurality of server-side components may further comprise a plurality of repositories providing data and content for the electronic device. Each of the plurality of repositories may be capable of managing at least one region of data and content in the electronic device.

In an embodiment of the present invention, each of the plurality of regions of data and content in the electronic device may be adapted to employ a security mechanism enabling a particular one of the plurality of server-side components to access or manage a particular one of the plurality of regions of data and content.

In an embodiment of the present invention, the plurality of regions of data and content in the electronic device may comprise a corporation related data and content region being managed by a corporate server-side component. The plurality of regions of data and content in the electronic device may also comprise an end-user related data and content region being managed by an end-user related server-side component. The plurality of regions of data and content in the electronic device may also comprise an operator related data and content region being managed by an operator related server-side component and the plurality of regions of data and content in the electronic device may also comprise a manufacturer related data and content region being managed by a manufacturer related server-side component.

In an embodiment of the present invention, the mobile services network may further comprise a management server for managing the electronic device. The plurality of server-side components may also be adapted to manage the plurality of regions of data and content in the electronic device via the management server.

In an embodiment of the present invention, each of the plurality of server-side components may be adapted to manage creating, updating, deleting, and configuring at least a corresponding one of the plurality of regions of data and content.

In an embodiment of the present invention, each of the plurality of server-side components may be associated with a corresponding region of the plurality of regions of data and content and each of the plurality of server-side components may further be adapted to manipulate and manage the corresponding region.

In an embodiment of the present invention, the plurality of regions of data and content may further comprise a firmware region managed by a management server which is managed by a wireless operator. The plurality of regions of data and content may also comprise an operating system region managed by the wireless operator. The plurality of regions of data and content may also comprise a corporate logos region managed by a corporate user access management server. The plurality of regions of data and content may also comprise a corporate confidential data and software region managed by the corporate user access management server and the plurality of regions of data and content may also comprise a user data region managed by the end-user.

In an embodiment of the present invention, each of the plurality of regions of data and content may comprise at least one update agent associated therewith for updating data and content. The at least one update agent may be adapted to add, delete, configure, update, and manage associated regions of the plurality of regions of data and content.

In an embodiment of the present invention, the electronic device may comprise one of a mobile cellular phone handset, personal digital assistant, pager, MP3 player, and a digital camera.

Aspects of the present invention may also be found in a mobile services network comprising an electronic device having access to a plurality of services. The electronic device may be adapted to be managed remotely. The mobile services network may comprise a management server for managing access to a plurality of services associated with the electronic device and a plurality of service management repositories for management of associated service components installed in non-volatile memory of the electronic device.

In an embodiment of the present invention, the associated service components may comprise at least one firmware and operating system layer, a communication stack, corporate data, and end-user personal data. Each of the associated service components may employ a corresponding security service available in the electronic device.

In an embodiment of the present invention, the plurality of service management repositories may further comprise a corporate management server and repository for managing corporate data in the electronic device, an operator management server and repository for managing the communication stack in the electronic device, a manufacturer management server and repository for managing the at least one firmware and operating system layer in the electronic device, and an end-user management server and repository for managing end-user personal data in the electronic device.

In an embodiment of the present invention, the electronic device may comprise one of a mobile cellular phone handset, personal digital assistant, pager, MP3 player, and a digital camera.

Aspects of the present invention may also be found in a mobile network capable of updating firmware and software in an electronic device. The mobile network may comprise a management server facilitating management of firmware and software in the electronic device, a corporate virtual user group management server for corporate user virtual group management, and a corporate software repository being employed for corporate user virtual group management and for distributing corporate software and corporate data to the electronic device.

In an embodiment of the present invention, the mobile network may also comprise a digital rights management server for disseminating rights to use corporate software and corporate data disseminated by the corporate virtual user group management server.

In an embodiment of the present invention, the electronic device may comprise non-volatile memory, and a corporate data segment for storing and managing corporate software and corporate data in non-volatile memory. Management of the corporate data segment may be conducted solely by the corporate virtual user group management server.

In an embodiment of the present invention, the mobile network may also comprise the corporate software repository being employed to update corporate software and corporate data in the corporate data segment in non-volatile memory of the electronic device and an update package repository being employed to retrieve update packages for updating firmware and software in the electronic device.

In an embodiment of the present invention, software in the electronic device may comprise an operating system and a plurality of applications updateable by the management server.

In an embodiment of the present invention, the electronic device may comprise one of mobile cellular phone handset, personal digital assistant, pager, MP3 player, and a digital camera.

Aspects of the present invention may be found in a method of managing a corporate data segment in an electronic device. The method may comprise retrieving corporate software and corporate data from a corporate data repository and facilitating retrieval via a corporate virtual user group management server, storing retrieved corporate software and corporate data in a corporate data segment of the electronic device, retrieving rights to access or execute corporate software and corporate data from a digital rights management server, and updating the corporate data segment.

In an embodiment of the present invention, the method may further comprise incorporating verification information in corporate software and corporate data retrieved from the corporate data repository and updating the corporate data segment in the electronic device only after verification of the verification information.

In an embodiment of the present invention, the method may further comprise incorporating end-user authentication information in corporate software and corporate data during retrieval from the corporate data repository.

In an embodiment of the present invention, the electronic device may comprise one of mobile cellular phone handset, personal digital assistant, pager, MP3 player, and a digital camera.

Aspects of the present invention may be found in a mobile services network capable of managing firmware and software in an electronic device. The mobile services network may comprise a plurality of management servers for managing different logical segments of non-volatile memory of the electronic device. The electronic device may comprise non-volatile memory being logically segmented into a plurality of segments with a different one of the plurality of management servers associated with each of the plurality of segments.

In an embodiment of the present invention, the plurality of management servers may employ digital rights management for security and for authorizing access to an associated one of the plurality of logical segments in the electronic device.

In an embodiment of the present invention, the plurality of segments may comprise a corporate data and software segment being associated with a corporate data management server being one of the plurality of management servers.

In an embodiment of the present invention, the electronic device may comprise a corporate data and software segment. The electronic device may also be associated with a corporate user membership for an employee of a corporation. The corporate data management server may be adapted to erase at least a portion of the corporate data and software segment on the electronic device when the employee of the corporation associated with the electronic device severs an employment relationship.

In an embodiment of the present invention, the electronic device may comprise a corporate data and software segment. The electronic device may also be associated with a corporate user membership for an employee of a corporation. The corporate data management server may be adapted to disable the electronic device when the employee of the corporation associated with the electronic device severs an employment relationship.

In an embodiment of the present invention, the electronic device may comprise a corporate data and software segment. The electronic device may also be associated with a corporate user membership for an employee of a corporation. The corporate data management server may be adapted to disable access to the corporate data and software segment of the electronic device to prevent unauthorized access to the corporate data segment in the electronic device.

In an embodiment of the present invention, the electronic device may be associated with end-user membership in a user group. The electronic device may comprise an end-user data and software segment. The end-user data and software segment may comprise a plurality of gaming software and address book data and an end-user data and software management server. The end-user data and software management server may also facilitate management of the end-user data and software segment, facilitate membership to the user group, and authorize access to the end-user data and software segment by at least one of a plurality of management servers.

In an embodiment of the present invention, the electronic device may comprise one of mobile cellular phone handset, personal digital assistant, pager, MP3 player, and a digital camera.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DIAGRAMS

DETAILED DESCRIPTION OF THE DIAGRAMS

Figure 1:
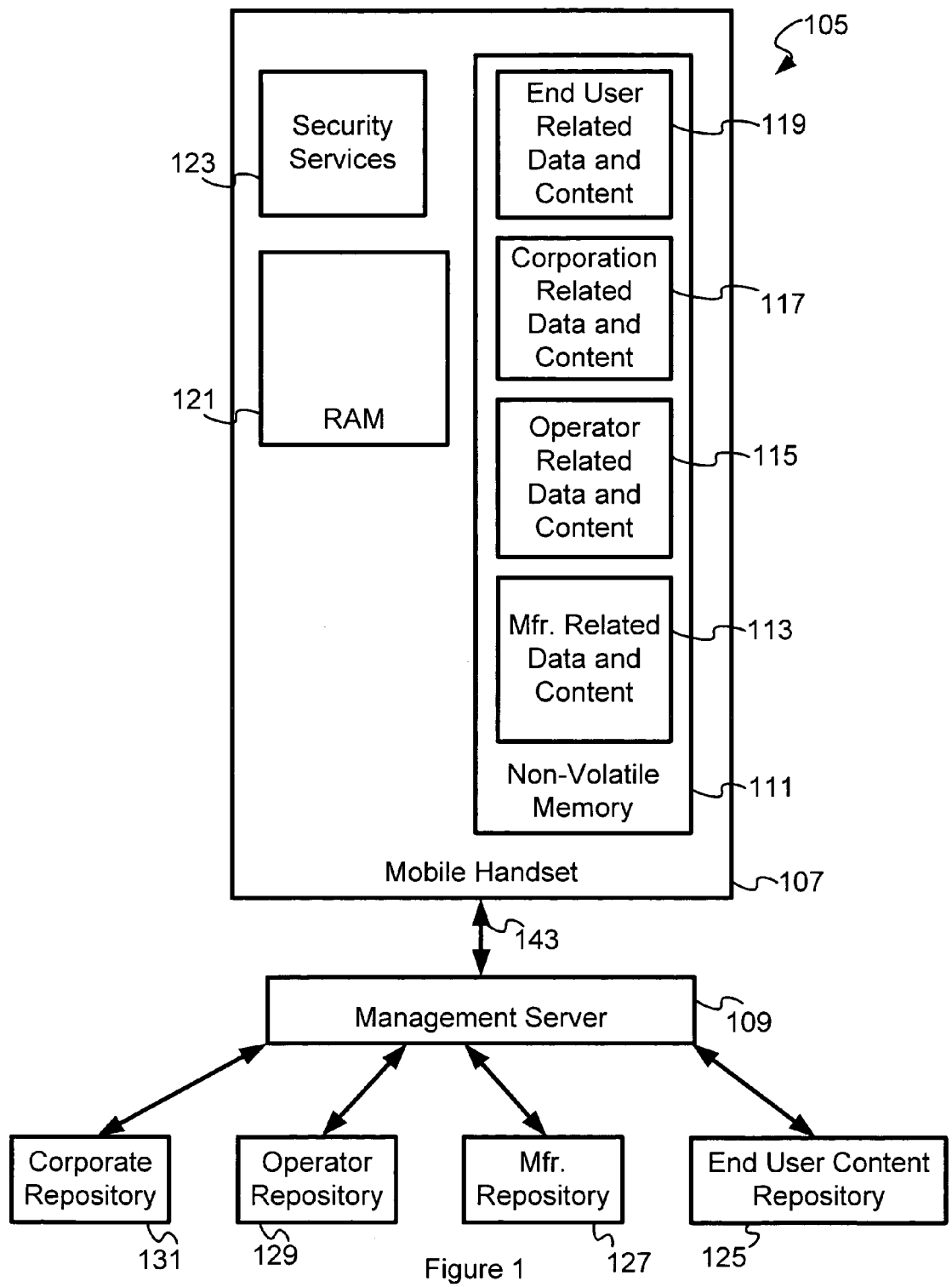
FIG. 1 is a block diagram illustrating a mobile services network wherein an electronic device has access to a plurality of services according to an embodiment of the present invention.

FIG. 1 is a block diagram illustrating a mobile services network wherein an electronic device has access to a plurality of services according to an embodiment of the present invention. An electronic device may be for example, mobile electronic devices having software/firmware, such as, mobile cellular phone handsets, personal digital assistants (PDA's), pagers, MP3 players, digital cameras, etc.

FIG. 1 discloses a mobile services network 105 wherein an electronic device, e.g., mobile handset 107, may be provided access to a plurality of services and supports remote management of associated service components installed therein. The electronic device, e.g., mobile handset 107, in the mobile services network 105 may have several sections in non-volatile memory 111, such as, a manufacturer related data and content area 113, an operator related data and content area 115, a corporation related data and content area 117, an end-user related data and content area 119, etc.

Each area may be associated with a specific repository of content and data, such as a corporate repository 131, operator repository 129, manufacturer repository 127, end-user content repository 125, etc., respectively. Each specific repository of content and data may be accessed by the electronic device via a management server 109. The electronic device may also comprise security services 123 to provides a number of security services. An appropriate one of these security services may be employed by the electronic device, e.g., mobile handset 107, to update an associated one of the sections in non-volatile memory 111.

The electronic device, e.g., mobile handset 107 may be capable of retrieving software, data, configuration information, or other content from any of repositories 131, 129, 127, and 125, and incorporate the content into appropriate section(s) of the non-volatile memory 111. The electronic device may be provided with random access memory (RAM) 121 and may communicate with the management server via communication link 143.

In an embodiment of the present invention, each of sections 113, 115, 117, and 119 of non-volatile memory 111 may be managed, individually and separately, by different management software located in associated repositories via management server 109 and employing associated security services 123 in the electronic device, e.g., mobile handset 107.

In an embodiment of the present invention, the management server 109 may be used for discovery of available updates for the various software/data installed in the various sections 113, 115, 117 and 119 of non-volatile memory 111 by electronic device, e.g., mobile handset 107. Updates to the software and data in the various sections of non-volatile memory may be maintained and managed by the associated repositories 131, 129, 127, 125.

For example, the corporate repository 131 may maintain and manage corporate software and corporate data installed in the corporation related data and content section 117 of the electronic device (mobile handset 107). Any updates available in the corporate repository 131 may be transferred to the electronic device (mobile handset 107) via the management server 109 and applied to the corporation related data and content section 117 of non-volatile memory 111 after authenticating the update, and the originating entity, such as, a vendor and the management server 109 employing the security services 123.

In an embodiment of the present invention, the electronic device may maintain a table of services mapped to components and associated security information with each of the services. The security information may be retrieved and used whenever the components mapped to a service need to be changed or updated.

Figure 2:
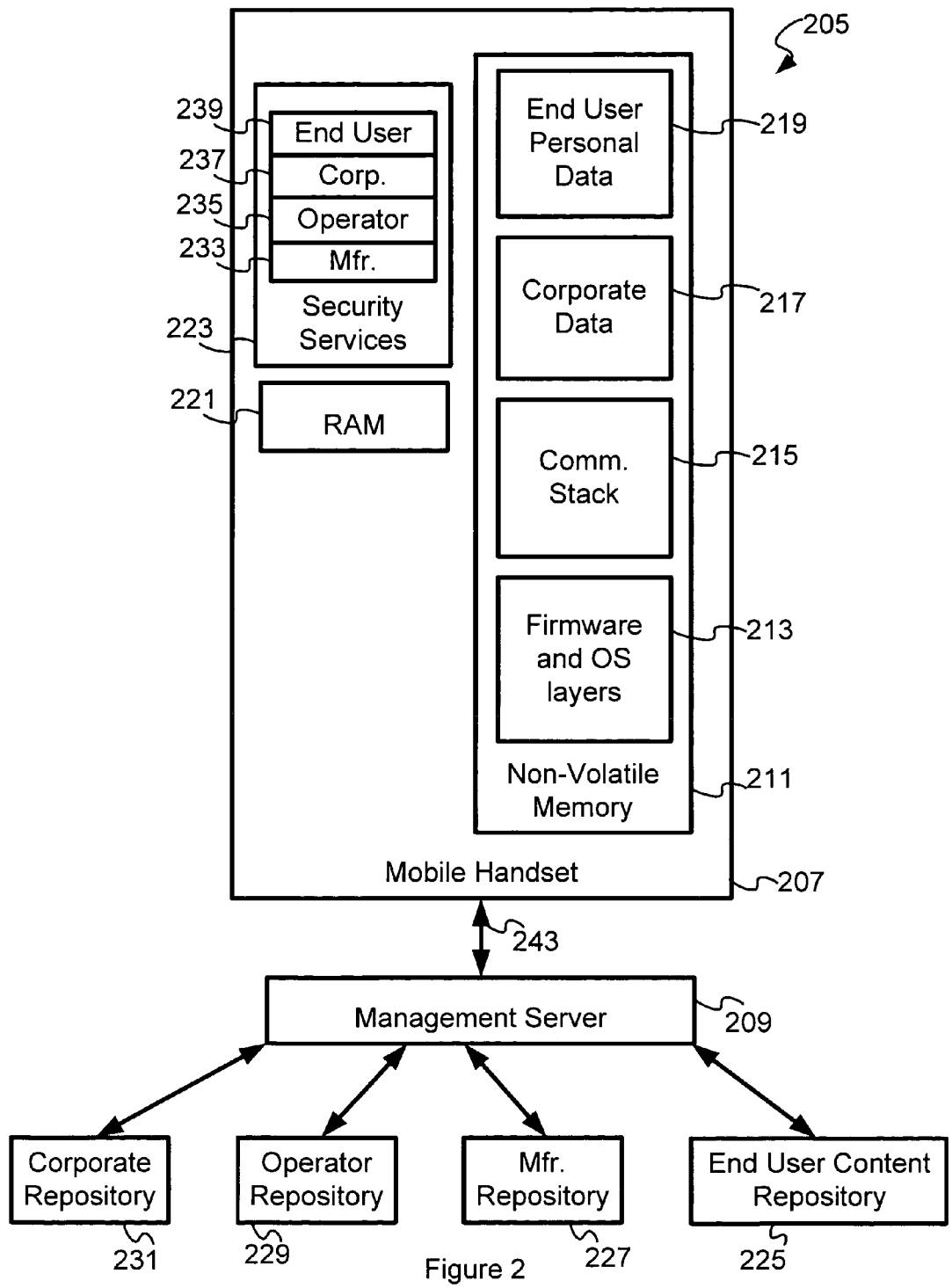
FIG. 2 is another block diagram illustrating a mobile services network wherein an electronic device has access to a plurality of services according to an embodiment of the present invention.

FIG. 2 is another block diagram illustrating a mobile services network wherein an electronic device has access to a plurality of services according to an embodiment of the present invention. An electronic device may be for example, mobile electronic devices having software/firmware, such as, mobile cellular phone handsets, personal digital assistants (PDA's), pagers, MP3 players, digital cameras, etc.

FIG. 2 discloses a mobile services network 205 wherein an electronic device, e.g., mobile handset 207, may be provided access to a plurality of services and support the remote management of associated service components installed in a non volatile memory 211, such as a firmware and operating system (OS) layers 213, communication stack 215, corporate data 217, and end-user personal data 219.

The non-volatile memory 211 of electronic device (mobile handset 207) may comprise several sections such as the firmware and OS layer 213, communication stack 215, corporate data 217, end-user personal data 219, etc. Each section may be capable of being remotely managed by associated servers or repositories, such as manufacturer repository 227, operator repository 229, corporate repository 231, and end-user content repository 225, respectively.

Each of the remotely managed sections 213, 215, 217 and 219 of non volatile memory 211 may be associated with a security service 223, such as manufacturer security service 233, operator security service 235, corporate security service 237, and end-user content security service 239, respectively. The security services 223 may be employed for updating code, data, service configuration information, or other types of content in respective sections of non-volatile memory 211.

In an embodiment of the present invention, a corporate management system located in corporate repository 231 may be used to remotely manage corporate data section 217 in the electronic device, for example, mobile handset 207. The electronic device may be provided with random access memory (RAM) 221 and may communicate with the management server via communication link 243.

In an embodiment of the present invention, the corporate management system may be located in management server 209 and may be capable of updating the corporate data section 217, employing code, data, or other content maintained by the corporate repository 231. The services of the corporate security service 237 may be employed to update and modify related activities securely.

In an embodiment of the present invention, an operator of a telecommunication network associated with a telecommunication service employed by the electronic device, for example, mobile handset 207, may communicate with external systems, such as the management server 209, manage the communication stack section 215 and other related sections in the electronic device (mobile handset 207), and employ the contents of the operator repository 229 to update or modify code, configuration, data and/or content in the communication stack section 215. The operator security service 235 may be employed for updating and modifying related activities securely.

In an embodiment of the present invention, a manufacturer of an electronic device (mobile handset 207) may manage the firmware and OS layers section 213 by updating the firmware, operating system components, device drivers, etc. The manufacturer security services 233 may be employed for updating and modifying related activities securely.

Figure 3:
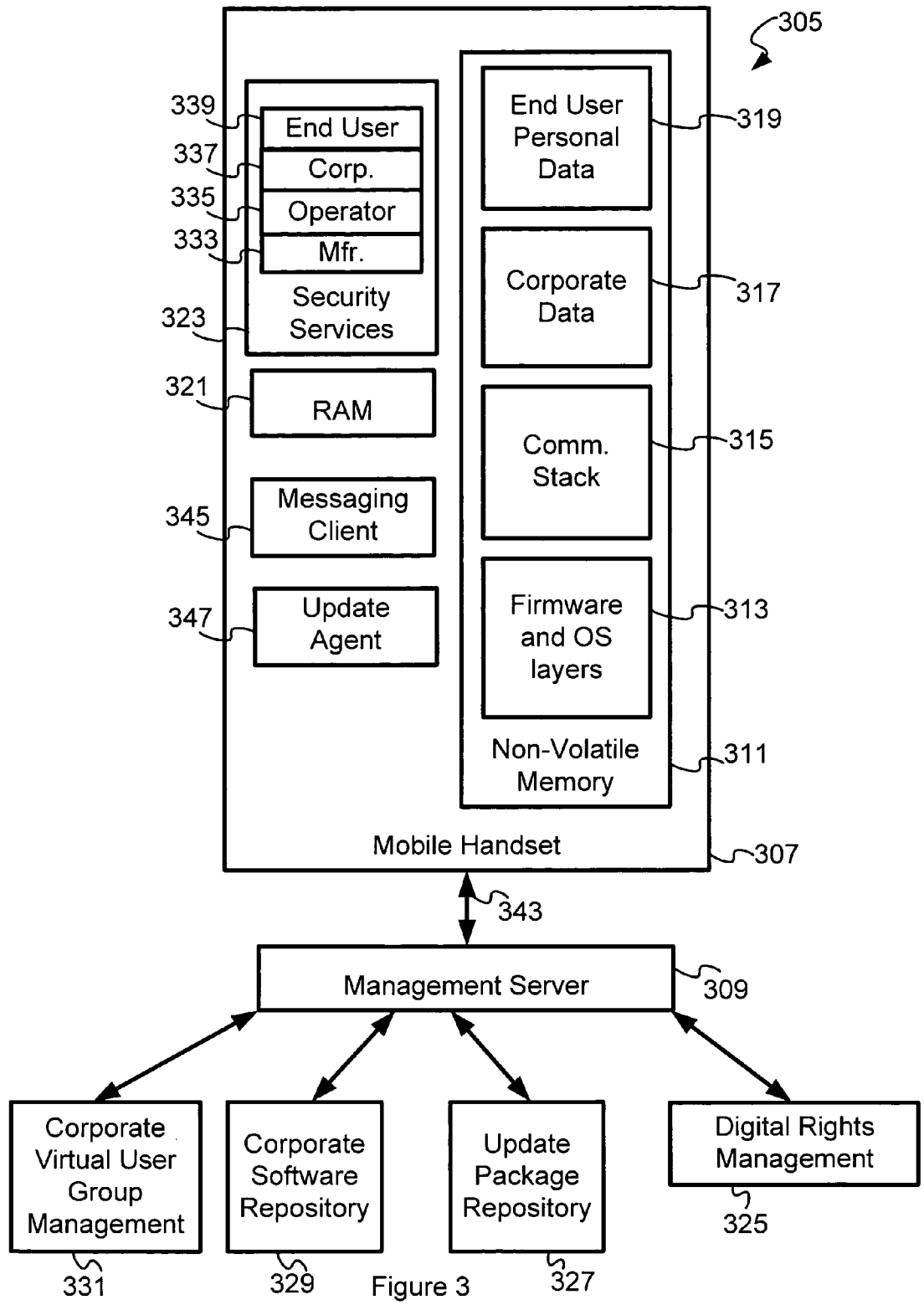
FIG. 3 is another block diagram illustrating a mobile services network wherein an electronic device has access to a plurality of services according to an embodiment of the present invention.

FIG. 3 is another block diagram illustrating a mobile services network wherein an electronic device has access to a plurality of services according to an embodiment of the present invention. An electronic device may be for example, mobile electronic devices having software/firmware, such as, mobile cellular phone handsets, personal digital assistants (PDA's), pagers, MP3 players, digital cameras, etc.

FIG. 3 discloses a mobile services network 305 wherein an electronic device, e.g., mobile handset 307, may be provided with access to a plurality of services and support the remote management of associated service components installed in a non volatile memory 311, such as firmware and OS layers 313, communication stack 315, corporate data 317, and end-user personal data 319 based upon membership of an end-user in a corporate virtual user group. Membership may be managed by a corporate virtual user group management server 331 accessible via a management server 309 to which the electronic device (e.g., mobile handset 307) may be communicatively coupled.

The electronic device, e.g., mobile handset 307 may comprise a messaging client 345 for handling notifications sent to the electronic device (mobile handset 307), an update agent 347 for updating firmware/software employing update packages delivered to the electronic device (mobile handset 307), and security services 323 that may be employed to support non-repudiation of update related activities, authentication of end user, etc.

Each of the remotely managed sections 313, 315, 317 and 319 of non-volatile memory 311 may be associated with a security service 323, such as manufacturer security service 333, operator security service 335, corporate security service 337, and end-user content security service 339, respectively. The security services 323 may be employed for updating code, data, service configuration information, or other types of content in respective sections of non-volatile memory 311.

The corporate virtual user group management server 331 may facilitate the management of the specifications, management of membership of the corporate virtual user group, specification and management of membership rights, etc.

Corporate software repository 329 communicatively coupled to management server 309 may be adapted to download corporate software to be installed in specific sections of non-volatile memory 311 of the electronic device (mobile handset 307), such as corporate data section 317. The electronic device may be provided with random access memory (RAM) 321 and may communicate with the management server via communication link 343.

Update package repository 327 communicatively coupled to management server 309 may be adapted to download update packages that may be used to update and/or install appropriate software for individual users in the virtual user group. The update agent 347 may also be employed for update activities in the electronic device e.g., mobile handset 311.

Digital rights management (DRM) server 325 communicatively coupled to the management server 309 may be employed to enable management of end-user rights to specific content that may be downloaded to the electronic device e.g., mobile handset 307, management of licensing agreements, verification of authenticity, etc.

Figure 4:
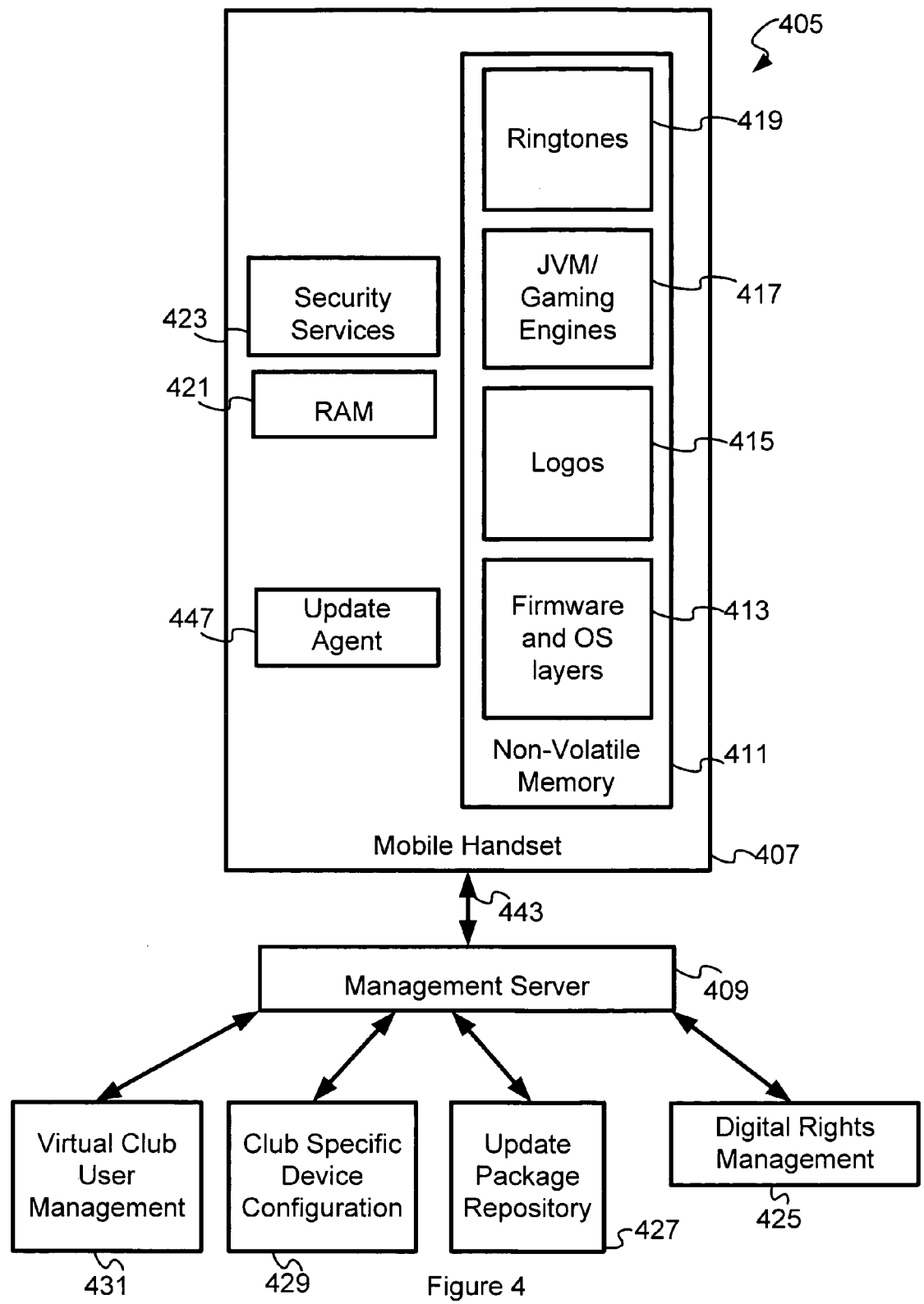
FIG. 4 is another block diagram illustrating a mobile services network wherein an electronic device access to a plurality of services according to an embodiment of the present invention.

FIG. 4 is another block diagram illustrating a mobile services network wherein an electronic device access to a plurality of services according to an embodiment of the present invention. An electronic device may be for example, mobile electronic devices having software/firmware, such as, mobile cellular phone handsets, personal digital assistants (PDA's), pagers, MP3 players, digital cameras, etc.

FIG. 4 discloses a mobile services network 405 wherein an electronic device, e.g., mobile handset 407, may be provided access to a plurality of services and support remote management of associated device configurations installed in a non volatile memory 411, such as firmware and OS layers 413, logos 415, java virtual machine (JVM)/gaming engines 417, and ringtones 419, based upon membership of an end-user in a virtual club.

The membership may managed by a virtual club user management server 431 communicatively coupled to a management server 409 in the mobile services network 405. The specifications of the device configuration for all end-user devices belonging to the virtual club may be maintained by a club specific device configuration server 429, while update packages for use in modifying or updating mobile device content or configurations may be provided by update package repository 427 that may also be communicatively coupled to management server 409.

An update agent 447 in the electronic device, e.g., mobile handset 407, may be employed to apply update packages to update firmware/software in firmware and OS layers 413, or other content in the electronic device (mobile handset 407) such as logos 415, JVM/gaming engines 417, and ringtones 419. The electronic device may be provided with random access memory (RAM) 421 and may communicate with the management server via communication link 443. Each of the remotely managed sections 413, 415, 417 and 419 of non-volatile memory 411 may be associated with a security service 423.

In an embodiment of the present invention, membership to the end-user group in a virtual club may be managed by a virtual club group management server 431 accessible via the management server 309 to which the electronic device (e.g., mobile handset 407) may be communicatively coupled. The specifications of exclusive logos, ringtones, JVM/gaming engines, etc. for members may be provided by the club specific device configuration server 429.

Update packages may be employed to update the logos, ringtones, JVM/gaming engines, etc, and may be provided by the update package repository. Digital rights management (DRM) server 425 may be employed for ascertaining the rights of the virtual club members to access content downloaded to the electronic device, e.g., mobile handset 407, as part of an update process.

In an embodiment of the present invention, the end-user devices or electronic devices, such as for example mobile handset 407, may belong to the virtual club of users supported by the virtual club user management server 431 and may be accessed by the management server 409 whenever one or more end-user devices or electronic devices, such as for example, mobile handset 407, need to be updated.

For example, if club specific device configuration needs to be changed and a corresponding update package is made available in the update package repository 427, the management server 409 may access membership information from the virtual club user management server 431 to determine the identity and/or address of the end-user devices, send notification to such end-user devices, and handle subsequent requests for update packages from the end-user devices.

In an embodiment of the present invention, club specific device configuration, such as configuration for a Pokeman™ user club or American Airlines Advantage™ membership club, may be pushed to all end-user devices, such as for example, mobile handset 407, by management server 409, employing the virtual club user management server 431 to determine membership information and other related information.

Each virtual club may be supported by providing its own special content such as ringtone(s), logo(s), JVM/gaming engines, firmware and OS components, etc. The update packages for installing the special content may be provided by the update package repository 427, the update agent 447 in the electronic device, e.g., mobile handset 407, and may be capable of updating the content employing the update packages.

Figure 5:
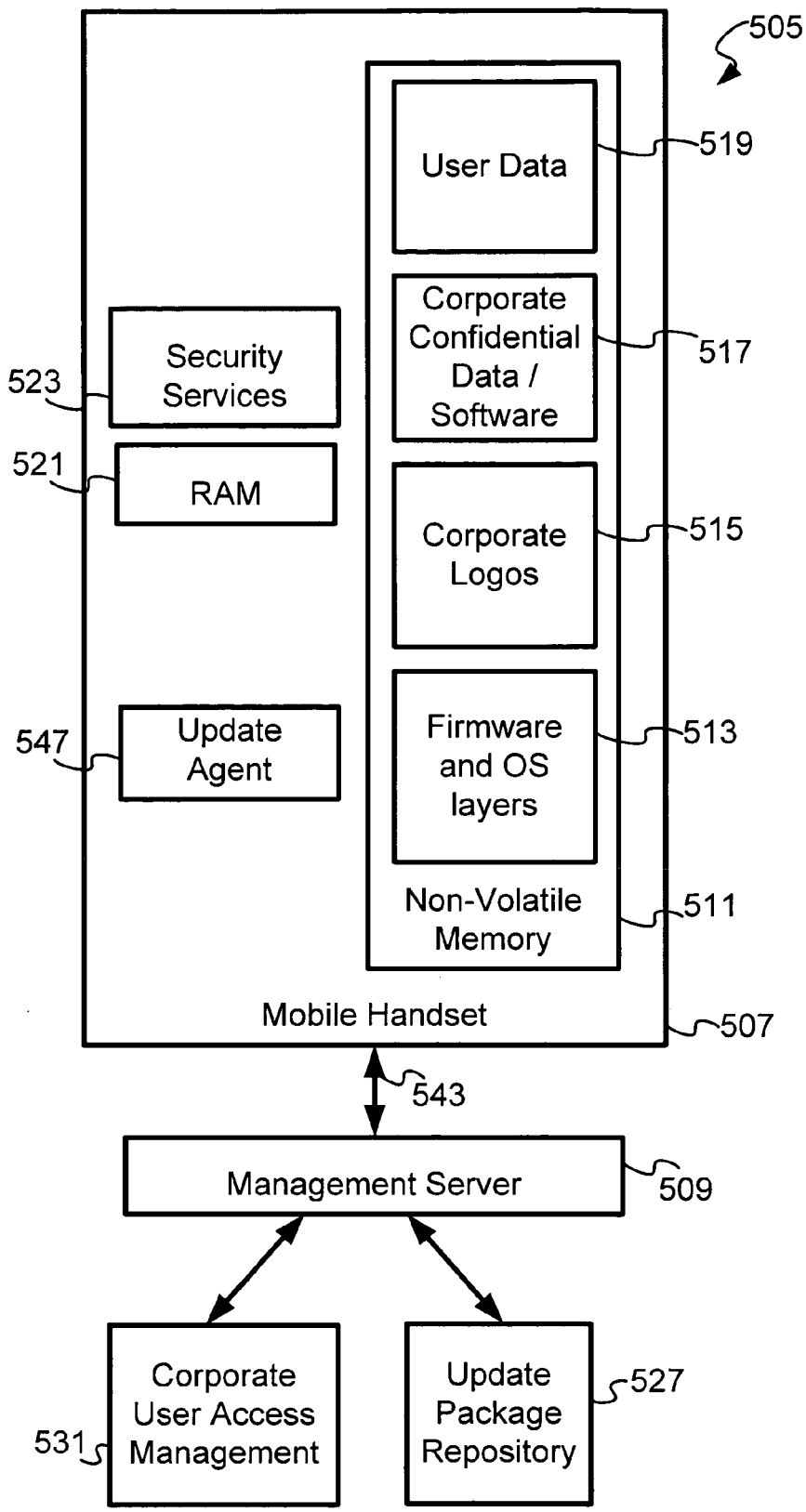
FIG. 5 is another block diagram illustrating a mobile services network wherein an electronic device access to a plurality of services according to an embodiment of the present invention.

FIG. 5 is another block diagram illustrating a mobile services network wherein an electronic device access to a plurality of services according to an embodiment of the present invention. An electronic device may be for example, mobile electronic devices having software/firmware, such as, mobile cellular phone handsets, personal digital assistants (PDA's), pagers, MP3 players, digital cameras, etc.

FIG. 5 disclose a mobile services network 505 wherein an electronic device, e.g., mobile handset 507, may be provided access to a plurality of services provided by the mobile services network 505. The electronic device may also be communicatively coupled to a management server 509 and may also support remote management of such services. Remotely management may include enabling and disabling of services based upon user access management information provided by a corporate user access management server 531 to which management server 509 may also be communicatively coupled.

In an embodiment of the present invention, corporate user access management server 531 and update package repository 527 may be accessed by management server 509 to manage the contents of various section of non-volatile memory 511 of the electronic device, e.g., mobile handset 507, to provide content and software in the electronic device that may be necessary for end-users.

Based upon membership of the end-user of the electronic device, e.g., mobile handset 507, in a corporation, corporate logos 515, corporate confidential data/software 517, etc. software may be initially installed in the electronic device, e.g., mobile handset 507, and subsequently updated, as necessary, by retrieving an appropriate update package from update package repository 527 and applying the update using update agent 547.

When the end-user severs or terminates a relationship with the corporation, some of the sections of non-volatile memory 511 in the electronic device may be deleted, blacked out, or reset by the corporate user access management server 531 by pushing or sending an update package after a notification, to the electronic device commanding the electronic device to apply the update package using update agent 547.

The electronic device, e.g., mobile handset 507, may have several sections in non-volatile memory and some of these sections may be deleted, blacked out, or reset by corporate user access management server 531 employing an appropriate update package provided by the update package repository when an employee/subscriber leaves or when an employee/subscriber responsibilities change in the corporation. Thus, corporate logos, corporate confidential data/software 517 may be removed when an end-user (who may be a corporate employee or service subscriber) leaves/terminates a relationship with the corporation while personal end-user data 519, firmware and OS layers 513 may be retained unmodified in the electronic device, e.g., mobile handset 507.

The electronic device may be provided with random access memory (RAM) 521 and may communicate with the management server via communication link 543. Each of the remotely managed sections 513, 515, 517 and 519 of non-volatile memory 511 may be associated with a security service 523.

Figure 6:
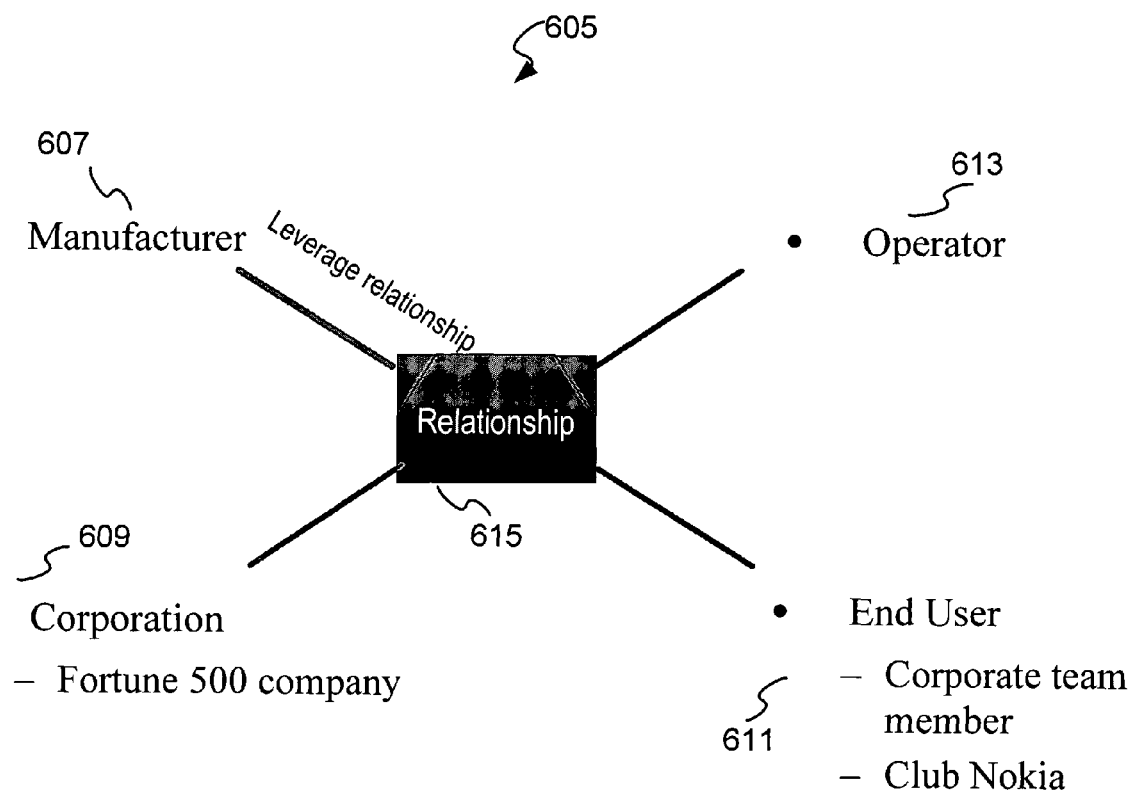
FIG. 6 is a diagram illustrating four dimensions of management according to an embodiment of the present invention.

FIG. 6 is a diagram illustrating four dimensions 605 of management that may be encountered in the wireless landscape. Relationships 615 between these four dimensions, namely manufacturers 607, operators 613, corporation 609, and end-users 611 may need to be managed. Manufacturers 607 and operators 613 (operators may also referred to as carriers) are often vying for control of relationships/subscribers, etc. Manufacturers 607 may now have the opportunity to use firmware upgrades to increase leverage in their relationships with operators/carriers 613. The end-users 611 as members of a corporate team or as members of an end-user club, such as Club Nokia™ may need to manage membership and benefits that accrue from such membership.

Figure 7:
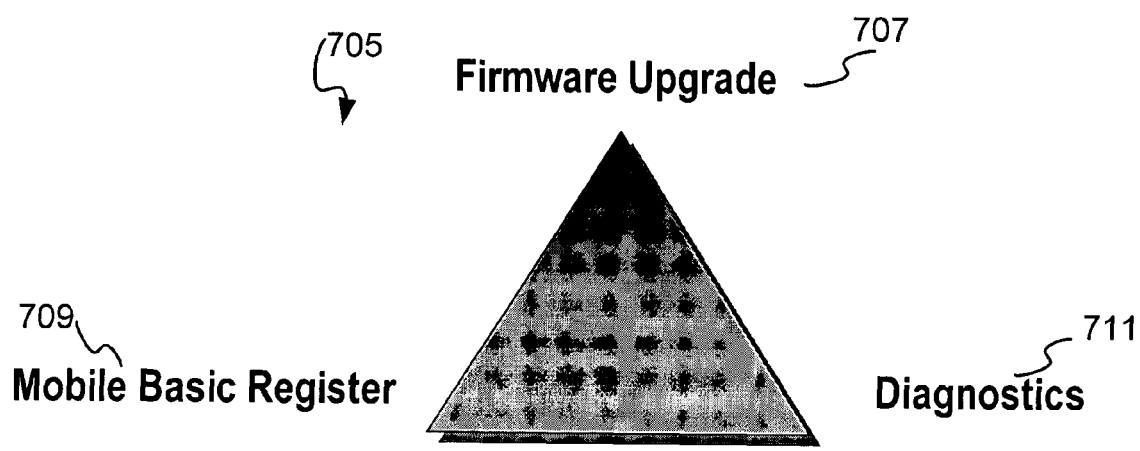
FIG. 7 is a diagram illustrating three exemplary problem domains according to an embodiment of the present invention.

FIG. 7 is a diagram illustrating three exemplary problem domains 705, for example, firmware upgrades 707, mobile basic registration 709, and diagnostics 711. In an embodiment of the present invention an end-to-end device management solution may be provided to service the 4 dimensions described above in FIG. 6.

Employing a mobile user database, for example, one that a manufacturer could maintain for registered end-users, it may be possible to identify the end-users, end-user locations, end-user services, and hardware/software end-users may typically use in an electronic and/or mobile device, etc. The user database may provide the ability to perform remote diagnostics, while also providing firmware update capability.

Figure 8:
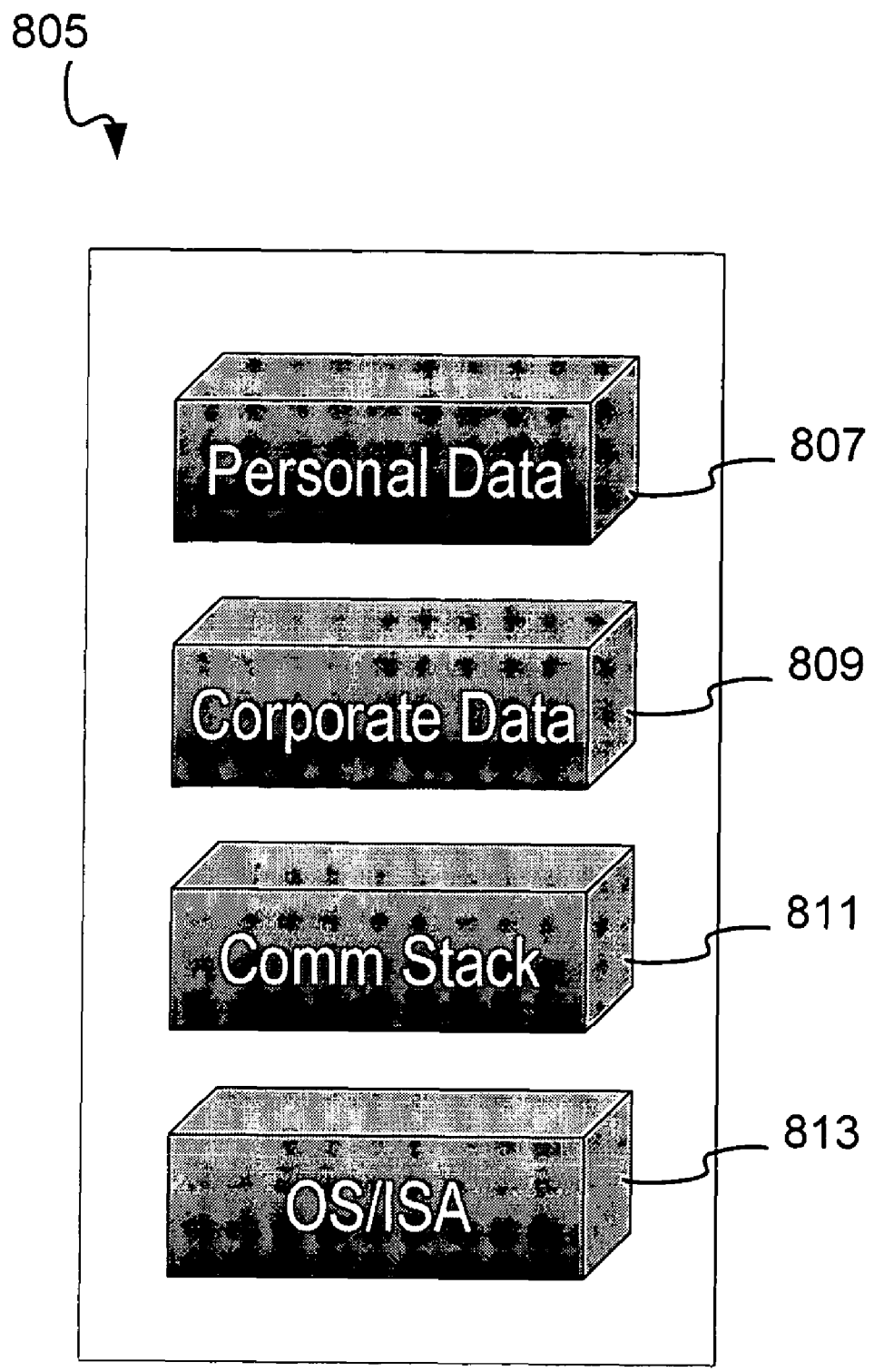
FIG. 8 is a block diagram illustrating an electronic device wherein the non-volatile memory is logically separated into specific components of code according to an embodiment of the present invention.

FIG. 8 is a block diagram illustrating an electronic device wherein the non-volatile memory 805 may be logically separated into specific components of code, i.e., OS/ISA section 813, communication stack 811, corporate data section 809, and a personal data section 807.

Logical separation may enable management of a dynamic mobile device environment that provides efficient update of mobile electronic devices, reduction in download time and update application time, etc. Logical separation may also enable remote management of personal and corporate data. Logical separation may also provide firmware updates when the handset experiences intermittent software crashes during operation. In an embodiment of the present invention, the end user may be notified through an short message system (SMS) message, manufacturer specific prompt, or customer service representative call, that an updated firmware version may be available to resolve a problem. The end user may also be directed to the menu to initiate downloading a firmware update.

In an embodiment of the present invention, the mobile services network may facilitate creation and management of a closed company-defined user group (Virtual User Group), whose membership may be restricted to company employees and may be managed by a corporate virtual user group management server. A user group may be defined and managed by the corporate virtual user group management server and software in electronic devices owned by employees of the company may be installed, updated, managed, and otherwise controlled by the corporate virtual user group management server.

In an embodiment of the present invention, if a company having created a corporate virtual user group wants to deploy a new software program for shipment tracking, a command prompt may be sent out to the mobile electronic devices associated with the unique corporate virtual user group. An end-user belonging to the user group may accept and process the software update. Within a couple of minutes, the entire virtual user group may be updated to the latest version of software corresponding to the update. Thus, an end-user may be able to download and upgrade core components in an electronic device beyond the high level functionality typically needed to update. Customization, based on corporate user virtual group membership, may be made easier to manage, especially for large user groups.

In an embodiment of the present invention, a new version of a messaging client specific to a group may be made available via the corporate user virtual group portal. The virtual user may notice a messaging client is available on the portal, initiate software download of an update package, and confirm download of the update package. The update package downloaded to the electronic device is then applied to the electronic device.

In an embodiment of the present invention, an end user may desire mobile access to a widely followed event, such as a movie or sporting event. The end user chooses the appropriate menu item, which queries the management server or corporate repository for available event-specific transformations at the user club (such as Club Nokia™) to which the end user may have membership.

The management server or corporate repository returns the list of available configurations and the user may choose the desired configuration. Information may then displayed about the size and description of the update associated with the selected configuration. The user typically confirms the selection, wherein the update process begins, starting with download of the associated update package from the corporate repository.

In an embodiment of the present invention, a corporate user membership for a terminated employee may be disabled when the employee's employment is terminated from a company managing the corporate user membership. The company may initiate a process to erase confidential corporate data from the electronic device that had been used by the employee prior to employment termination.

In an embodiment of the present invention, an electronic device that is lost by a member of corporate user group, or one that has been stolen may be disabled to prevent unauthorized access to corporate data and services. When an employee loses an electronic device with confidential company information, the unauthorized access to such confidential data may be prevented. The company may initiate a process to erase confidential corporate data on the electronic device.

In an embodiment of the present invention, a company may desire that a certain class of employee (based on corporate employee categorization or grouping) be provided access to a recently created or licensed embedded mobile application. The company may notify the corporate user, based on user profile information available to the corporate user group management server, that an embedded application is available. The end-user may initiate the update of the electronic device with the embedded application.

Thus, the present invention may facilitate creation of an integrated solution for end-to-end device management solution. The integrated solution may comprise support for:

Introduction of a completely dynamic after point-of-sale mobile electronic device for corporate/virtual user group use;

Leveraging and strengthening a manufacturer's customer relationship within the 4 dimensional model;

Introduction of a new channel of delivery of applications and services; and

Establishing a baseline for a mobile electronic device, with separation of components, for future innovation.

Although a system and method according to the present invention has been described in connection with a preferred embodiment, it is not intended to be limited to the specific form set forth herein, but on the contrary, is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. A mobile services network for management of service components in an electronic device, the mobile services network comprising:
   a plurality of regions of data and content stored in non-volatile memory in the electronic device;
   a plurality of server-side components, each of the server-side components remotely managing at least one associated region of the plurality of regions of data and content in the non-volatile memory of the electronic device; and
   wherein remote access to each of the plurality of regions of data and content in the electronic device is controlled by an associated one of a plurality of security mechanisms which execute on the electronic device to enable a particular one of the plurality of server-side components to update code, data, service configuration information or other types of content in the at least one associated region in non-volatile memory of the plurality of regions of data and content.

2. The mobile services network according to claim 1, wherein the plurality of server-side components further comprise:
   a plurality of repositories providing data and content for the electronic device, each of the plurality of repositories being capable of managing at least one region of data and content in the electronic device.

3. The mobile services network according to claim 1, wherein the plurality of regions of data and content in the electronic device comprise:
   a corporation related data and content region being managed by a corporate server-side component;
   an end-user related data and content region being managed by an end-user related server-side component;
   an operator related data and content region being managed by an operator related server-side component; and
   a manufacturer related data and content region being managed by a manufacturer related server-side component.

4. The mobile services network according to claim 1, further comprising:
   a management server for managing the electronic device, wherein the plurality of server-side components manage the plurality of regions of data and content in the electronic device via the management server.

5. The mobile services network according to claim 4, wherein each of the plurality of server-side components are adapted to manage creating, updating, deleting, and configuring at least a corresponding one of the plurality of regions of data and content.

6. The mobile services network according to claim 5, wherein each of the plurality of server-side components is associated with a corresponding region of the plurality of regions of data and content and each of the plurality of server-side components is further adapted to manipulate and manage the corresponding region.

7. The mobile services network according to claim 6, wherein the plurality of regions of data and content further comprise:
   a firmware region managed by a management server which is managed by a wireless operator;
   an operating system region managed by the wireless operator;
   a corporate logos region managed by a corporate user access management server;
   a corporate confidential data and software region managed by the corporate user access management server; and
   a user data region managed by the end-user.

8. The mobile services network according to claim 7, wherein each of the plurality of regions of data and content comprise at least one update agent associated therewith for updating data and content, and wherein the at least one update agent is adapted to add, delete, configure, update, and manage associated regions of the plurality of regions of data and content.

9. The mobile services network according to claim 1, wherein the electronic device comprises one of a mobile cellular phone handset, personal digital assistant, pager, MP3 player, and a digital camera.

10. A mobile services network comprising an electronic device having access to a plurality of services, and wherein the electronic device being adapted to be managed remotely, the mobile services network comprising:
    a management server for managing access to a plurality of services associated with the electronic device;
    a plurality of service management repositories, each service management repository arranged to remotely manage at least one associated service component of a plurality of service components installed in non volatile memory of the electronic device; and
    wherein secure access to each of the plurality of associated service components in the electronic device by a corresponding one of the plurality of service management repositories is controlled by an associated one of a plurality of security mechanisms which execute in the electronic device to enable a particular one of the plurality of server-side components to update code, data, service configuration information or other types of content in the at least one associated region in non-volatile memory of the plurality of regions of data and content.

11. The mobile services network according to claim 10, wherein the associated service components comprise:
    at least one firmware and operating system layer;
    a communication stack;
    corporate data; and
    end-user personal data, wherein each of the associated service components employ a corresponding security service available in the electronic device.

12. The mobile services network according to claim 11, wherein the plurality of service management repositories further comprise:
    a corporate management server and repository for managing corporate data in the electronic device;
    an operator management server and repository for managing the communication stack in the electronic device;
    a manufacturer management server and repository for managing the at least one firmware and operating system layer in the electronic device; and
    an end-user management server and repository for managing end-user personal data in the electronic device.

13. The mobile services network according to claim 10, wherein the electronic device comprises one of a mobile cellular phone handset, personal digital assistant, pager, MP3 player, and a digital camera.

14. A mobile network for updating firmware and software in an electronic device, the mobile network comprising:
    a management server facilitating management of firmware and software in the electronic device;
    a corporate virtual user group management server for corporate virtual user group management;
    a corporate software repository being employed for corporate virtual user group management and for securely distributing corporate software and corporate data to at least one of a plurality of separate segments of non-volatile memory in the electronic device, the at least one segment associated with a particular user group; and wherein remote access to each of the plurality of segments of non-volatile memory by the management server is controlled by an associated one of a plurality of security mechanisms which execute in the electronic device to enable a particular one of the plurality of server-side components to update code, data, service configuration information or other types of content in the at least one associated region in non-volatile memory of the plurality of regions of data and content.

15. The mobile network according to claim 14, further comprising a digital rights management server for disseminating rights to use corporate software and corporate data disseminated by the corporate virtual user group management server.

16. The mobile network according to claim 15, wherein the electronic device further comprises:
non-volatile memory; and
a corporate data segment for storing and managing corporate software and corporate data in non-volatile memory, wherein management of the corporate data segment being conducted solely by the corporate virtual user group management server.

17. The mobile network according to claim 15, further comprising:
the corporate software repository being employed to update corporate software and corporate data in the corporate data segment in non-volatile memory of the electronic device; and
an update package repository being employed to retrieve update packages for updating firmware and software in the electronic device.

18. The mobile network according to claim 17, wherein software in the electronic device comprises:
an operating system; and
a plurality of applications updateable by the management server.

19. The mobile network according to claim 14, wherein the electronic device comprises one of mobile cellular phone handset, personal digital assistant, pager, MP3 player, and a digital camera.

20. A method of managing a corporate data segment in an electronic device, the method comprising:
retrieving corporate software and corporate data from a corporate data repository and facilitating retrieval via a corporate virtual user group management server;
storing retrieved corporate software and corporate data in a corporate data segment of the electronic device;
retrieving rights to access or execute corporate software and corporate data from a digital rights management server;
updating the corporate data segment;
wherein the electronic device comprises a plurality of logically separate data segments; and
wherein remote access to each of the plurality of data segments by a corresponding one of a plurality of data repositories is controlled by an associated one of a plurality of security mechanisms in the electronic device.

21. The method according to claim 20, further comprising:
incorporating verification information in corporate software and corporate data retrieved from the corporate data repository; and
updating the corporate data segment in the electronic device only after verification of the verification information.

22. The method according to claim 21, further comprising:
incorporating end-user authentication information in corporate software and corporate data during retrieval from the corporate data repository.

23. The method according to claim 20, wherein the electronic device comprises one of mobile cellular phone handset, personal digital assistant, pager, MP3 player, and a digital camera.

24. A mobile services network for managing firmware and software in an electronic device, the mobile services network comprising:
a plurality of management servers for managing different logical segments of non-volatile memory of the electronic device;
the electronic device comprising non-volatile memory segmented into a plurality of logical segments with a different one of the plurality of management servers associated with each of the plurality of logical segments; and
wherein remote access to each of the plurality of logical segments of non-volatile memory by a corresponding one of a plurality of management servers is controlled by an associated one of a plurality of security mechanisms in the electronic device to enable a particular one of the plurality of server-side components to update code, data, service configuration information or other types of content in the at least one associated region in non-volatile memory of the plurality of regions of data and content.

25. The mobile services network according to claim 24, wherein the plurality of management servers employing digital rights management for security and for authorizing access to an associated one of the plurality of logical segments in the electronic device.

26. The mobile services network according to claim 25, wherein the plurality of segments comprise a corporate data and software segment being associated with a corporate data management server being one of the plurality of management servers.

27. The mobile services network according to claim 26, wherein the electronic device comprises a corporate data and software segment, and the electronic device being associated with a corporate user membership for an employee of a corporation, wherein the corporate data management server being adapted to erase at least a portion of the corporate data and software segment on the electronic device when the employee of the corporation associated with the electronic device severs an employment relationship.

28. The mobile services network according to claim 26, wherein the electronic device comprises a corporate data and software segment, and the electronic device being associated with a corporate user membership for an employee of a corporation, the corporate data management server being adapted to disable the electronic device when the employee of the corporation associated with the electronic device severs an employment relationship.

29. The mobile services network according to claim 26, wherein the electronic device comprises a corporate data and software segment, and the electronic device being associated with a corporate user membership for an employee of a corporation, wherein the corporate data management server is adapted to disable access to the corporate data and software segment of the electronic device to prevent unauthorized access to the corporate data segment in the electronic device.

30. The mobile services network according to claim 26, wherein the electronic device is associated with end-user membership in a user group, and the electronic device comprises an end-user data and software segment, the end-user data and software segment comprising:
- a plurality of gaming software and address book data; and
- an end-user data and software management server, the end-user data and software management server facilitating management of the end-user data and software segment;

facilitating membership to the user group, and authorizing access to the end-user data and software segment by at least one of a plurality of management servers.

31. The mobile services network according to claim 24, wherein the electronic device comprises one of mobile cellular phone handset, personal digital assistant, pager, MP3 player, and a digital camera.

* * * * *